United States Patent
Bendel et al.

(10) Patent No.: US 9,855,991 B2
(45) Date of Patent: Jan. 2, 2018

(54) VEHICLE WHICH IS OPERABLE BY A MOTOR AND BY MUSCULAR ENERGY AND HAS AN IMPROVED TORQUE SENSOR

(71) Applicant: Robert Bosch GmbH, Stuttgart (DE)

(72) Inventors: Karl Bendel, Schwieberdingen (DE); Peter Kimmich, Steinenbronn (DE); Markus Hinterkausen, Moeglingen (DE); Marko Liebler, Bretten (DE)

(73) Assignee: ROBERT BOSCH GMBH, Stuttgart (DE)

( * ) Notice: Subject to any disclaimer, the term of this patent is extended or adjusted under 35 U.S.C. 154(b) by 85 days.

(21) Appl. No.: 14/888,063

(22) PCT Filed: Mar. 13, 2014

(86) PCT No.: PCT/EP2014/054926
§ 371 (c)(1),
(2) Date: Mar. 15, 2016

(87) PCT Pub. No.: WO2014/183901
PCT Pub. Date: Nov. 20, 2014

(65) Prior Publication Data
US 2016/0185419 A1     Jun. 30, 2016

(30) Foreign Application Priority Data
May 17, 2013   (DE) .................. 10 2013 209 262

(51) Int. Cl.
*B62M 6/50*     (2010.01)
*G01L 1/16*     (2006.01)
(Continued)

(52) U.S. Cl.
CPC ................ *B62M 6/50* (2013.01); *B62M 6/55* (2013.01); *G01L 1/165* (2013.01); *G01L 3/10* (2013.01); *G01L 3/101* (2013.01); *G01L 5/225* (2013.01)

(58) Field of Classification Search
CPC . B62M 6/50; B62M 6/55; G01L 1/165; G01L 3/10; G01L 3/101; G01L 5/225
(Continued)

(56) References Cited

U.S. PATENT DOCUMENTS

| 2003/0074985 | A1 | 4/2003 | Liao | |
| 2006/0130585 | A1* | 6/2006 | Magee | G01L 1/165 |
| | | | | 73/570 |

(Continued)

FOREIGN PATENT DOCUMENTS

WO    WO 03/034013    4/2003

OTHER PUBLICATIONS

Chih-Jer Lin et al. "Study on Wireless Torque Measurement Using SAW Sensors", In Tech, Feb. 24, 2012, pp. 109-137.*

(Continued)

*Primary Examiner* — Joseph M Rocca
*Assistant Examiner* — Felicia L. Brittman
(74) *Attorney, Agent, or Firm* — Norton Rose Fulbright US LLP; Gerard Messina

(57) ABSTRACT

A vehicle which is operable by a motor and/or muscular energy, in particular an electric bicycle, which includes an electric motor, a crankshaft drive having a first crank, a second crank, and a crankshaft, a torque sensor for detecting a torque applied by a rider at the crankshaft drive, and a control unit, which is set up to actuate the electric motor based on at least the values acquired by the torque sensor to drive the vehicle, the torque sensor being situated at the
(Continued)

crankshaft drive and the torque sensor including at least one surface acoustic wave sensor.

16 Claims, 6 Drawing Sheets

(51) Int. Cl.
    *G01L 3/10*         (2006.01)
    *B62M 6/55*        (2010.01)
    *G01L 5/22*         (2006.01)

(58) Field of Classification Search
    USPC ........................................................ 180/206.4
    See application file for complete search history.

(56) References Cited

U.S. PATENT DOCUMENTS

| | | | |
|---|---|---|---|
| 2007/0028700 A1 | 2/2007 | Liu et al. | |
| 2012/0312618 A1* | 12/2012 | Chan | B62M 6/55 180/206.4 |
| 2013/0024137 A1* | 1/2013 | Grassi | G01L 3/108 702/43 |

OTHER PUBLICATIONS

Marien Van Ditten: "Torque Sensing for E-bike Application", Master Thesis, Jun. 27, 2011, pp. 1-147.

\* cited by examiner

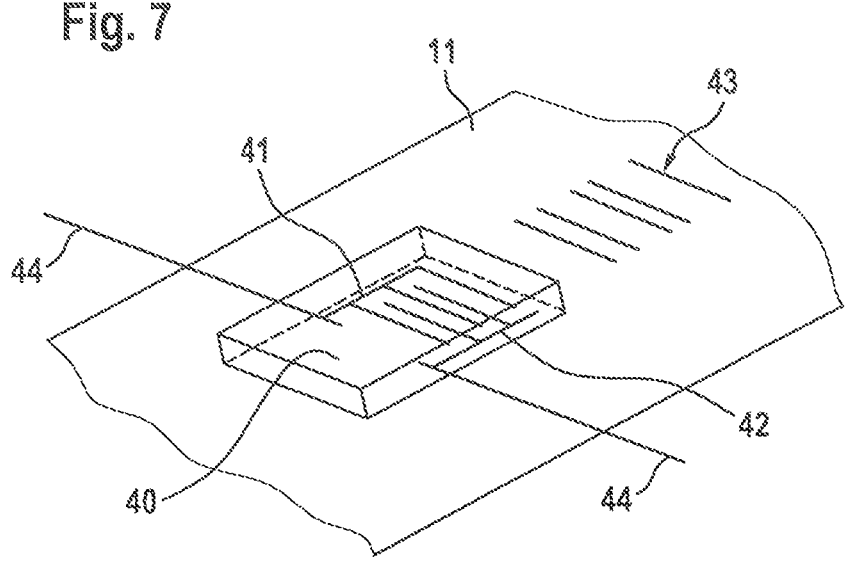
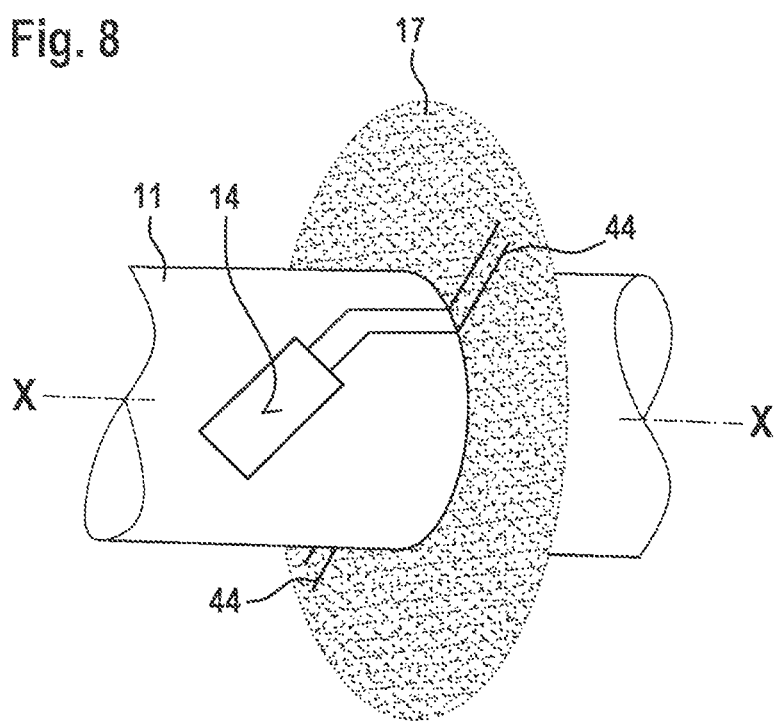

VEHICLE WHICH IS OPERABLE BY A MOTOR AND BY MUSCULAR ENERGY AND HAS AN IMPROVED TORQUE SENSOR

FIELD OF THE INVENTION

The present invention relates to a vehicle which is operable by a motor and/or by muscular energy, in particular an electric bicycle, and which has an improved torque sensor.

BACKGROUND INFORMATION

Torque sensors, such as in the form of strain gauges, are used in electric bicycles on a crankshaft drive in order to detect a torque applied by a rider. A control unit then controls the electric motor based on the rider-applied torque and a rider-selected support by an electric motor. However, the currently used torque sensors are relatively complex and very expensive. In addition, measuring methods that use an additional gear unit providing spring pretensioning for measuring axial forces of a helical gear of the additional gear unit in order to measure a torque are known from US 2003 0074985 A1, for instance. For cost- and weight-related reasons, in particular, such measuring methods are not really suitable either.

SUMMARY OF THE INVENTION

In contrast, the vehicle according to the present invention, in particular the electric bicycle, which is operable by a motor and/or muscular energy and has the features described herein offers the advantage that a torque applied by a rider is able to be acquired in a reliable and simple manner. The acquisition may take place in a contact-free manner and very inexpensively. Furthermore, the torque sensor according to the present invention has only very small dimensions and is very robust. This makes it particularly suitable for electric bicycles. In the present invention, this is achieved in that the sensor used for detecting a torque applied by a rider at a crankshaft drive includes at least one surface acoustic wave sensor, which is disposed on the crankshaft drive. Via a dynamic measurement of a torque using surface acoustic waves, the surface acoustic wave sensor carries out a direct measurement of a torque due to torsional loading because of a rider-applied torque. A time delay in a reflection of a high-frequency query pulse is used as a measure for the torsion of the surface acoustic wave. Since the surface acoustic wave sensor may be a purely passive component, no separate energy source is required for the operation. To detect the torque, a query unit, for instance, outputs a high frequency signal to the surface acoustic wave sensor. If a rider-applied torque is present at the surface acoustic wave sensor, the signal returned to the query unit differs, which may be utilized for ascertaining the torque applied by the rider. As an alternative, the query/transmission unit is integrated into the surface acoustic wave sensor. Therefore, the design according to the present invention with a surface acoustic wave sensor has a very simple and robust structure and, in particular, also allows the use of a considerably less complex electronics system. Because of the wireless querying of the surface acoustic wave sensor, a placement at inaccessible locations is possible as well. The torque sensor according to the present invention has no negative effect on a mechanical overall efficiency and is very lightweight, space saving and cost-effective.

The further descriptions herein disclose further embodiments of the present invention.

It especially may be that the surface acoustic wave sensor is situated on a sleeve which is connected to the crankshaft. The sleeve, for example, may be connected to the crankshaft via a tooth construction. As an alternative, it may be that the surface acoustic wave sensor is disposed directly on the crankshaft.

It furthermore may be that the surface acoustic wave sensor is a discrete component and specifically includes a piezoelectric substrate and an interdigital transformer as well as an antenna. The interdigital transformer is situated on the substrate and has a comb-like structure of two electrodes.

As an alternative, components of the surface acoustic wave sensor or the entire surface acoustic wave sensor may be disposed directly on a surface on which a torque is to be measured. For instance, the components of the surface acoustic wave sensor may be printed onto the surface to be measured.

In addition, the surface acoustic wave sensor may include a reflector unit. The reflector unit especially may be provided on the separate component on which the rest of the surface acoustic wave sensor is situated as well. As an alternative, the reflector unit is disposed directly on the surface on which the torque is to be measured. Especially particularly, the reflector unit may include grooves or other elongated depressions and/or elongated projecting regions.

According to one further embodiment of the present invention, the vehicle also includes a circuit board, and an antenna of the surface acoustic wave sensor is situated on the circuit board or is integrated into the circuit board. Especially particularly, the circuit board may be situated on the crankshaft of the vehicle.

Moreover, the vehicle according to the present invention may include a second surface acoustic wave sensor. If torsion occurs at the surface, an elongation can be detected by the one surface acoustic wave sensor, and a compression with the aid of the other surface acoustic wave sensor. The first and the second surface acoustic wave sensors may have one longitudinal axis in each case, the longitudinal axes of the two surface acoustic wave sensors not being situated parallel to a longitudinal axis of the crankshaft. In other words, the longitudinal axes of the two surface acoustic wave sensors run obliquely with respect to the longitudinal axis of the crankshaft. Especially particularly, the two surface acoustic wave sensors may be disposed in such a way that their longitudinal axes intersect. The longitudinal axes of the two surface acoustic wave sensors especially may intersect at a 90° angle.

As an alternative, the two longitudinal axes of the first and second surface acoustic wave sensor are situated in symmetry with the longitudinal axis of the crankshaft.

To allow an especially compact configuration, the surface acoustic wave sensor includes a separate query unit for querying the surface acoustic wave sensor. The query unit transmits and receives signals and may be situated on a housing of the crankshaft drive.

Moreover, the electric motor of the vehicle may be situated directly on the crankshaft drive. This makes it possible to realize what is understood as a center motor placement in an electric bicycle.

The vehicle according to the present invention especially may be an electric bicycle, as already explained previously. In this case the advantages obtained by using the surface acoustic wave sensors become apparent in a particularly outstanding manner.

Exemplary embodiments of the present invention are described in detail below, with reference to the accompanying drawing.

BRIEF DESCRIPTION OF THE DRAWINGS

FIG. 7 shows a schematic illustration of an alternative embodiment of the torque sensor according to the present invention.

FIG. 8 shows a schematic illustration of an alternative embodiment of the torque sensor according to the present invention.

DETAILED DESCRIPTION

In the following text, an electric bicycle 1 according to a first exemplary embodiment of the present invention is described in detail with reference to FIGS. 1 through 5.

Figure 1:
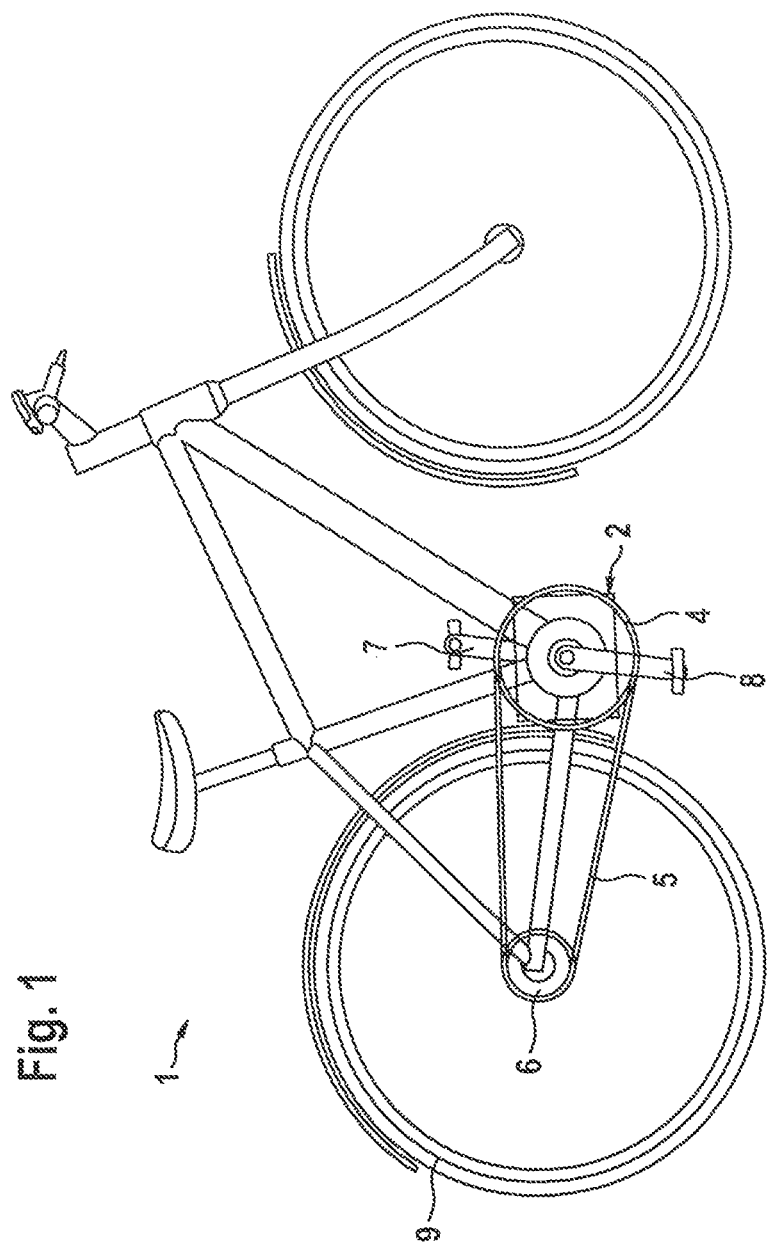
FIG. 1 shows a schematic view of an electric bicycle according to a first exemplary embodiment of the present invention.

As can be gathered from FIG. 1, electric bicycle 1 includes a crankshaft drive 2 having a crankshaft 12 and a first crank 7 and a second crank 8. Reference numeral 3 denotes an electric motor, which is connected to a chain ring (output) by way of a gear unit 10. Via a chain 5, chain ring 4 outputs a drive force to a pinion 6 situated on a rear wheel 9 of the electric bicycle.

Figure 2:
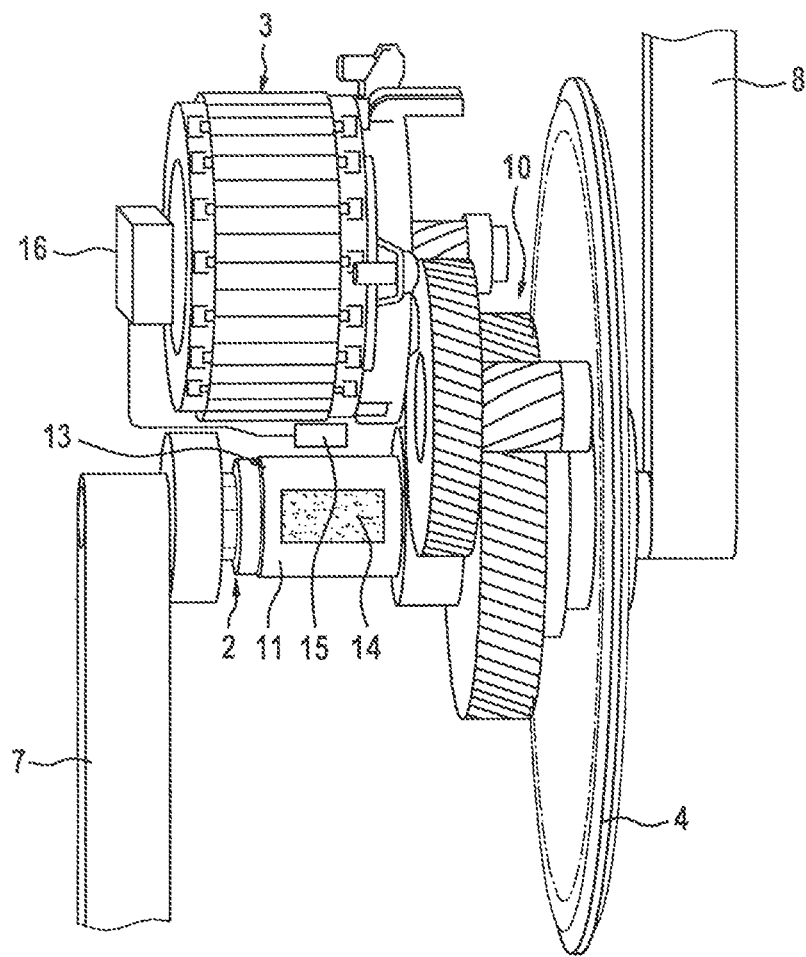
FIG. 2 shows a detailed illustration of a crankshaft drive and an electric motor of the vehicle from FIG. 1.
Figure 3:
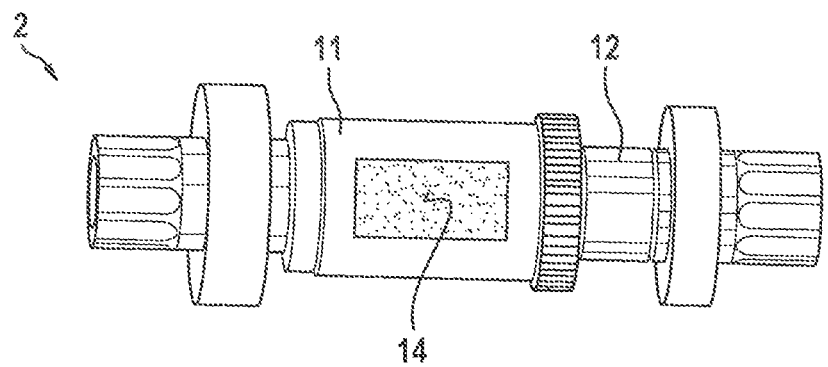
FIG. 3 shows a schematic illustration of a crankshaft having a torque sleeve from FIG. 2.

Crankshaft drive 2 together with gear unit 10 and electric motor 3 is shown in detail in FIG. 2. FIG. 3, in particular, reveals that a torque sleeve 11 is situated in the center region of crankshaft 12. A torque transmitted by the rider to the crankshaft is transmitted to torque sleeve 11 as well. This torque also can be queried at torque sleeve 11. Torque sleeve 11 is used for summing up the two torques from the right and left pedal, so that one sensor is basically sufficient for the detection.

Figure 4:
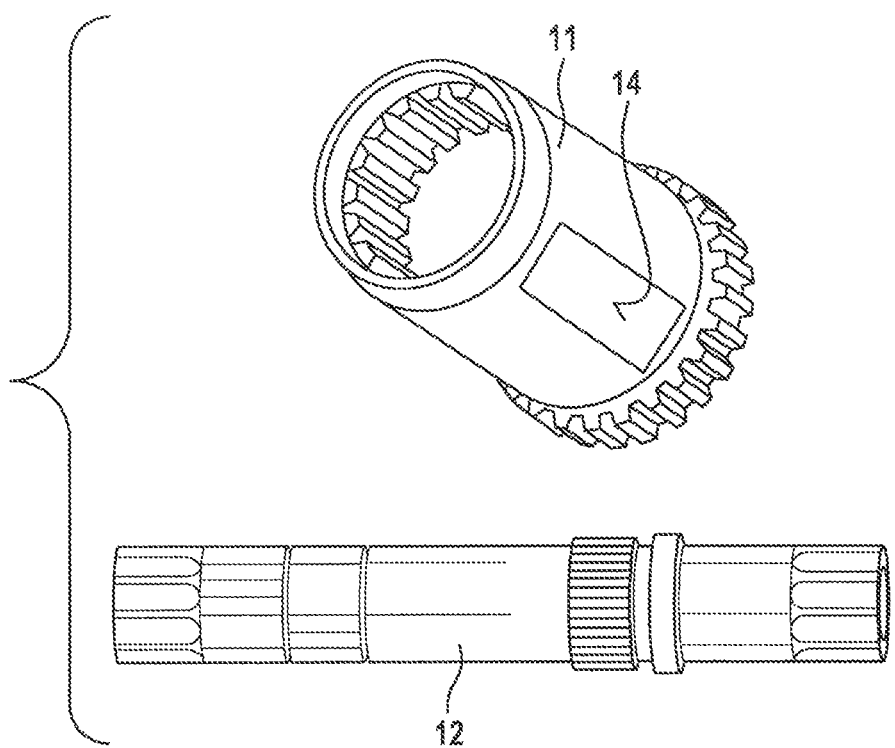
FIG. 4 shows a schematic illustration of the individual components of the crankshaft and torque sleeve from FIG. 3.

In the present invention a torque sensor 13, which includes a surface acoustic wave sensor 14 and a separate transceiver unit 15, is provided in addition. Surface acoustic wave sensor 14 is disposed on torque sleeve 11, as can be gathered from FIGS. 2 through 4. For greater clarity, FIG. 4 shows crankshaft 12 and torque sleeve 11 as separate components. The connection between crankshaft 12 and torque sleeve 11 is implemented via a spline (see FIGS. 3 and 4). Transceiver unit 15 is shown on a housing component (depicted only schematically in FIG. 2) and is connected to a control unit 16. Control unit 16 is set up to actuate electric motor 3 on the basis of at least the values acquired by torque sensor 13. Control unit 16 additionally may control electric motor 3 based on further values such as the speed of the electric bicycle and a crankshaft speed.

Figure 5:
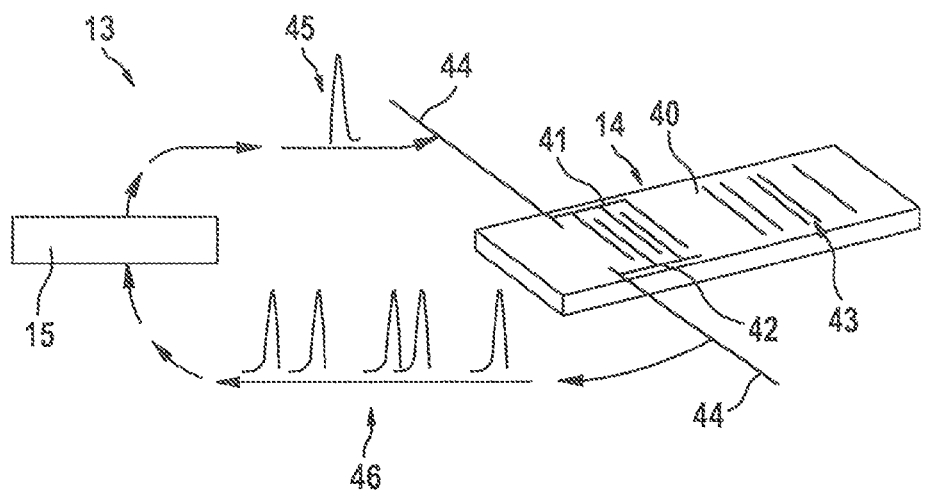
FIG. 5 shows a schematic illustration of the method of functioning of the torque sensor from FIG. 1.

Torque sensor 13 is illustrated in detail in FIG. 5. As can be gathered from FIG. 5, actual surface acoustic wave sensor 14 does not require a separate energy supply. Transceiver unit 15 transmits a high frequency query pulse 45 to surface acoustic wave sensor 14. The latter includes a first electrode 41, a second electrode 42, a reflector 43, and an antenna structure 44. Electrodes 41, 42 as well as reflector 43 are situated on a substrate 40, which is a piezoelectric substrate in this particular exemplary embodiment. Piezoelectric substrate 40 may be made of ceramic material or a polymer, for instance. In addition, the two electrodes 41, 42, which have a comb-like structure and form an interdigital transformer, may be printed onto substrate 4. Reflector 43 may include raised areas and/or grooves.

The surface of substrate 40 provides a plane which in particular avoids potential interference in a propagation of the surface wave due to the sleeve's curvature and creates planar (propagation) surfaces on the sleeve.

With the aid of the acoustic surface waves, it is then possible to detect a direct measurement of the elastic deformation induced in crankshaft 12 by the rider by torsional loading. A time delay in a reflection of high-frequency query pulse 45 is used as a measure for the torsion of crankshaft 12. Via antenna structure 44, high-frequency query pulse 45 is routed to the actual sensor structure, i.e., the interdigital transformer. Electromagnetic pulse 45 is transformed into an acoustic (mechanical) surface wave with the aid of an inverse piezoelectric effect. It is then reflected at the structures of reflector 43 and output again via antenna structure 44 with the aid of the piezoelectric effect in the form of high-frequency responses 46, and received by transceiver unit 15.

As can be gathered from the above description, surface acoustic wave sensor 14 thus is a purely passive component, which does not require a separate energy source for its operation. As a result, surface acoustic wave sensor 14 does not need servicing. Surface acoustic wave sensor 14 also has a much simpler electronics system; in particular, no oscillating circuit like, for instance, in cases where strain gauges are employed is necessary. Surface acoustic wave sensor 14 also requires little space and is very robust. More specifically, the surface acoustic wave sensor can be placed even in poorly accessible locations, such as on crankshaft 12, where only little space is available in connection with electric motor 3 (also because of the querying ability by radio—no cables, the electronics may be situated farther away). Torque sensor 13 according to the invention furthermore is very lightweight and able to be produced in a very cost-effective manner. In addition, no acoustic emissions arise by the use of torque sensor 13 according to the present invention, and in particular, there is no negative effect on a mechanical overall efficiency at crankshaft 2.

It should furthermore be noted that surface acoustic wave sensor 14 according to the present invention may be provided on substrate 40 as a premanufactured component, which then is simply glued to torque sleeve 11. As an alternative, the structure of the surface acoustic wave sensor may also be applied directly onto a surface, for instance the surface of torque sleeve 11, e.g., by printing. Possibly existing intrinsic stresses of the sensor system caused by the assembly, which could lead to falsified signals, are avoidable.

Because of a propagation speed of the surface wave that is reduced by the factor $1/100000$ in comparison with the speed of light of the query pulse, high-frequency response 46 of surface acoustic wave sensor 14 takes place virtually without any interference. Any interference reflections from the environment, such as echoes or the like, in most cases have decayed within the time of the delayed response. This results in a very precise signal and thus a very precise recording of the torque applied by the rider.

FIGS. 6 through 10 show exemplary alternatives. As can be gathered from FIG. 6, this exemplary embodiment illustrates a first surface acoustic wave sensor 14*a* and a second surface acoustic wave sensor 14*b*. The two surface acoustic wave sensors 14*a*, 14*b* have longitudinal axes 24*a*, 24*b*, which intersect at an angle α of 90°. The use of two surface acoustic wave sensors 14*a*, 14*b* makes it possible to acquire a preference signal which is independent of thermal influences, in particular. An even more precise detection of a torque applied by the rider is possible as a result. The two longitudinal axes 24*a*, 24*b* are disposed at a 45° angle in relation to a center axis X-X of crankshaft 12.

FIG. 7 shows a further alternative embodiment of the surface acoustic wave sensor 14. In contrast to the first exemplary embodiment, surface acoustic wave sensor 14 according to the third exemplary embodiment in FIG. 7 has a substrate 40, on which only the first and second electrode 41, 42 are situated. Reflector 43 with a corresponding structure is applied directly on the component on which the torque is to be measured, i.e., torque sleeve 11 in this exemplary embodiment, for instance in the form of grooves. The grooves may be introduced into the sleeve material by laser or mechanically by machining, for instance. This discontinuity at the surface of the sleeve causes the reflection of the surface wave starts at the substrate. By introducing a plurality of grooves, an unambiguous pattern (coding) can be imprinted onto the response signal and a separation of the torque signal from possible interference signals which could be caused by the electric motor in the form of structure-borne noise, for instance, be achieved as a result. By separating the reflectors from the substrate, assembly-related interference, in particular, can be avoided for the most part and in an uncomplicated manner, such as the introduction of prestresses into the sensor in a clamping connection between substrate and sleeve.

To ensure the most optimal transmission possible of the surface wave from the substrate to torque sleeve 11, substrate 40 is mechanically contacted with the side of the interdigital transformer, such as via a bonding process. The separately manufactured piezoelectric substrate having the printed interdigital transformer may be produced from a ceramic material or a polymer. Since both the interdigital transformer and torque sleeve 11 are made of metal, a non-conductive bonding agent has to be used.

FIG. 8 shows another embodiment according to a fourth exemplary embodiment of the present invention, in which antenna structure 44 is disposed on a circuit board 17. Circuit board 17 is implemented in the form of a disk and situated around torque sleeve 11. Antenna structure 44 runs in the radial direction with respect to a center axis X-X of the crankshaft. Antenna structure 44 may be provided on circuit board 17 in any desired form and length and thus be positioned in an optimal manner.

Figure 6:
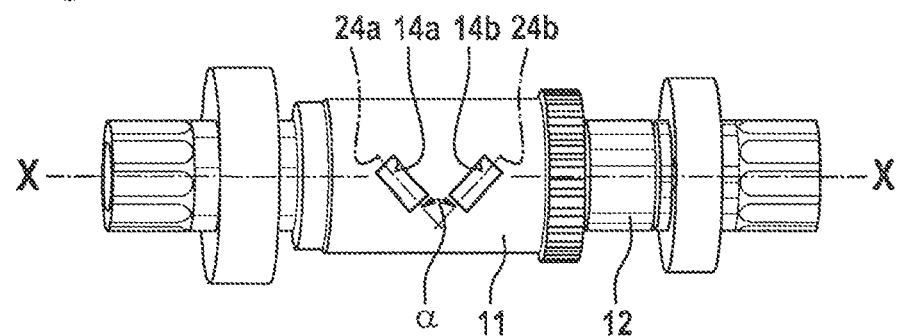
FIG. 6 shows a schematic illustration of an alternative embodiment of the torque sensor according to the present invention.
Figure 9:
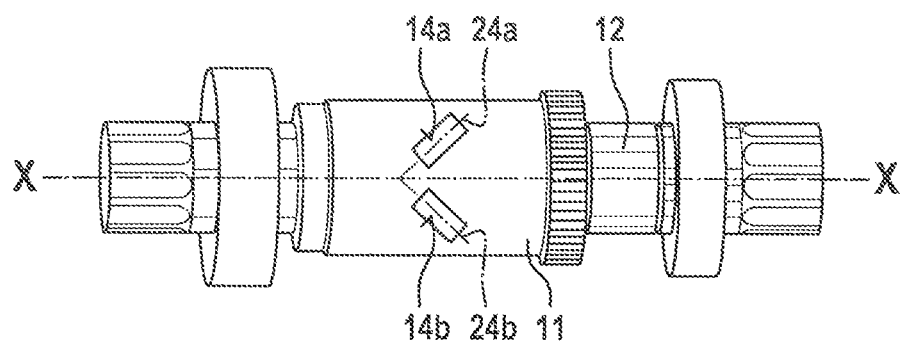
FIG. 9 shows a schematic illustration of an alternative embodiment of the torque sensor according to the present invention.

The fifth exemplary embodiment of the present invention shown in FIG. 9 essentially corresponds to the second exemplary embodiment shown in FIG. 6, two surface acoustic wave sensors 14*a*, 14*b* being provided here as well. However, the placement of the two surface acoustic wave sensors 14*a*, 14*b* in FIG. 9 is rotated by 90° in comparison with FIG. 6. In other words, the two surface acoustic wave sensors 14*a*, 14*b* are situated on both sides with respect to a longitudinal plane that encloses center axis X-X of crankshaft 12. In all other respects, this exemplary embodiment corresponds to the second exemplary embodiment.

Figure 10:
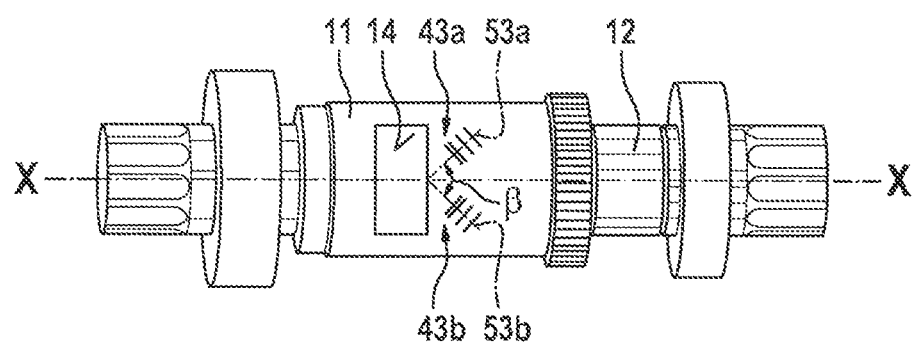
FIG. 10 shows a schematic illustration of an alternative embodiment of the torque sensor according to the present invention.

FIG. 10 shows a sixth exemplary embodiment of the present invention, in which only one surface acoustic wave sensor 14 is furnished. However, a first reflector 43*a* and a second reflector 43*b* are provided in this exemplary embodiment. The two reflectors 43*a*, 43*b* are situated directly on the surface of torque sleeve 11. Moreover, the two reflectors 43*a*, 43*b* are placed in such a way that longitudinal axes 53*a*, 53*b* of the two reflectors 43*a*, 43*b* intersect at an angle β of 90°. As a result, two propagation paths are predefined for the reflection of the surface acoustic wave, for which only a single surface acoustic wave sensor 41 is required. The use of only one surface acoustic wave sensor 14 makes it possible to reduce costs, in particular. The assembly is much easier as well. The reflectors can be provided by grooves in the surface of torque sleeve 11, for example.

It should furthermore be noted that surface acoustic wave sensor 14 may alternatively also be situated on an inner surface of torque sleeve 11. This makes it possible to obtain optimal protection from electromagnetic interference pulses, in particular. For example, antenna structure 44 may be routed to the outside through the torque sleeve via an opening.

As a further alternative, surface acoustic wave sensor 14 may also be implemented as a foil element and be fixed in place by bonding, for instance. In this case reflector 43 may be provided directly on the surface of torque sleeve 11.

A further alternative embodiment of the present invention is to place antenna structure 44 on a toothed wheel of gear unit 10 situated in the immediate vicinity of torque sleeve 11, for instance. This makes it possible for antenna structure 44 to extend in the radial direction without an additional component being required.

The invention claimed is:

1. A vehicle which is operable using a motor and/or muscular energy, comprising:
   an electric motor;
   a crankshaft drive having a first crank, a second crank, and a crankshaft;
   a torque sensor to acquire a torque applied by a rider at the crankshaft drive; and
   a control unit for actuating the electric motor, based on at least the values acquired by the torque sensor to drive the vehicle;
   wherein the torque sensor is disposed on the crankshaft drive, and
   wherein the torque sensor includes at least one surface acoustic wave sensor;
   wherein the at least one surface acoustic wave sensor performs, via a direct measurement of a torque using surface waves, a direct measurement of a torsional load due to a torque introduced by a rider and using a time delay in a reflection of a high-frequency query pulse as a measure for the torsion of the surface wave.

2. The vehicle of claim 1, wherein the at least one surface acoustic wave sensor is situated on a sleeve, which is connected to the crankshaft.

3. The vehicle of claim 1, wherein the at least one surface acoustic wave sensor is situated directly on the crankshaft, and is a printed surface acoustic wave sensor or a surface sensor applied on a foil.

4. The vehicle of claim 1, wherein the at least one surface acoustic wave sensor is a separate component, and includes a piezoelectric substrate, an interdigital transformer having a first electrode and a second electrode, and an antenna structure.

5. The vehicle of claim 1, wherein components of the at least one surface acoustic wave sensor or the entire surface acoustic wave sensor are/is disposed directly on a surface on which the torque is to be measured.

6. The vehicle of claim 1, wherein the at least one surface acoustic wave sensor includes a reflector unit, which is situated on the at least one surface acoustic wave sensor or directly on a surface on which a torque is to be measured.

7. The vehicle of claim 6, wherein the reflector unit has grooves and/or projections on a surface.

8. The vehicle of claim 1, further comprising:
a circuit board, wherein an antenna of the at least one surface acoustic wave sensor is situated on the circuit board or is integrated into the circuit board.

9. The vehicle of claim 1, wherein the at least one surface acoustic wave sensor includes a first surface acoustic wave sensor and a second surface acoustic wave sensor.

10. The vehicle of claim 9, wherein the first surface acoustic wave sensor and the second surface acoustic wave sensor each have a longitudinal axis, and the longitudinal axes of the surface acoustic wave sensors are not running parallel to a longitudinal axis of the crankshaft.

11. The vehicle of claim 9, wherein the first surface acoustic wave sensor and the second surface acoustic wave sensor are disposed so that the longitudinal axes of the surface acoustic wave sensors intersect at an angle of 90°.

12. The vehicle of claim 9, wherein the first surface acoustic wave sensor and second surface acoustic wave sensor are positioned symmetrically relative to one another about the longitudinal axis of the crankshaft.

13. The vehicle of claim 1, wherein the torque sensor includes a separate transceiver unit, which is situated on a housing of the crankshaft drive or a housing of the electric motor.

14. The vehicle of claim 1, wherein the electric motor is situated directly at the crankshaft drive.

15. The vehicle of claim 1, wherein the vehicle is an electric bicycle.

16. A vehicle which is operable using a motor and/or muscular energy, comprising:
an electric motor;
a crankshaft drive having a first crank, a second crank, and a crankshaft;
a torque sensor to acquire a torque applied by a rider at the crankshaft drive; and
a control unit for actuating the electric motor, based on at least the values acquired by the torque sensor to drive the vehicle;
wherein the torque sensor is disposed on a sleeve connected to the crankshaft between the first crank and the second crank;
wherein the torque sensor includes only a single surface acoustic wave sensor and no other torque sensor is disposed on the sleeve; and
wherein the single surface acoustic wave sensor has two reflectors situated in such a way that longitudinal axes of the two reflectors intersect at an angle of 90°, the two reflectors providing two predefined propagation paths for reflection of surface acoustic waves.

* * * * *